July 19, 1960 F. W. MILLER 2,945,361
CONGELATION APPARATUS
Filed June 9, 1958
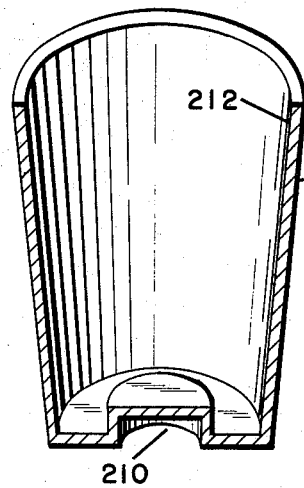
FIG. 2
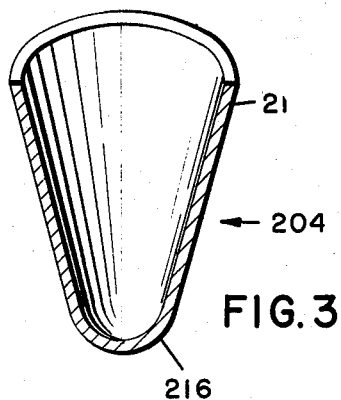
FIG. 3
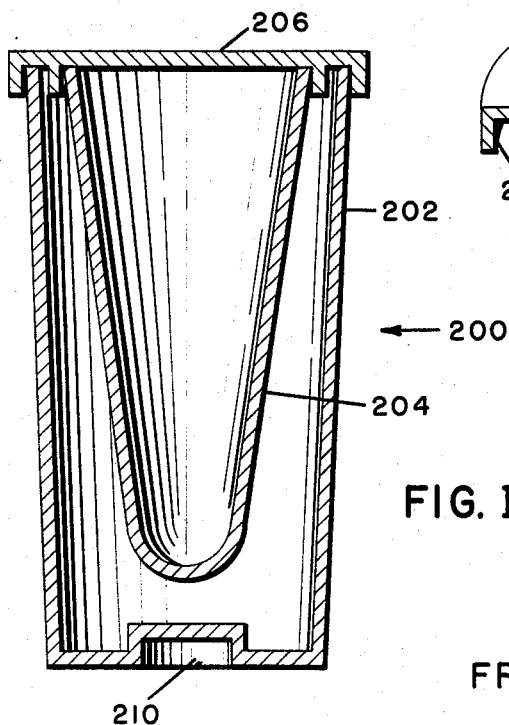
FIG. 1
FIG. 4
INVENTOR.
FREDERICK W. MILLER
BY
Walter G. Finch,
ATTORNEY

United States Patent Office 2,945,361
Patented July 19, 1960

2,945,361

CONGELATION APPARATUS

Frederick W. Miller, 5846 Bellona Ave.,
Baltimore 12, Md.

Filed June 9, 1958, Ser. No. 740,733

1 Claim. (Cl. 62—355)

This invention relates generally to refrigeration equipment, and more particularly to congelation apparatus.

The primary object of this invention is to provide an apparatus for forming a drinking or serving vessel of a congealed edible liquid.

It is a further object of this invention to provide a novel positioning means for ice vessel molds.

These and other objects and advantages of this invention will become more readily apparent and understood from the accompanying specification and single sheet of drawings in which:

Fig. 1 is a longitudinal section of a molding arrangement comprising the present invention;

Fig. 2 is a perspective view, partly in section, of the female mold portion therefor;

Fig. 3 is a perspective view, partly in section, of the male mold portion, and

Fig. 4 is a perspective view of a top piece for the molding arrangement, shown partly in section.

Referring now to the drawings, there is shown a three-piece mold 200 consisting of a cylindrical-shaped female mold 202, a conical-shaped male mold 204, and a top piece 206.

Mold 202 is constructed of thermally good conducting material, such as aluminum or copper and has side walls 208 tapering down from a large open top to a smaller closed bottom.

A cylindrical inwardly protruding boss 210 is centrally formed in the bottom 200 of the female mold 202. The top edge 212 is squared, that is, located in a plane at right angles to the longitudinal axis of the female mold 202.

Male mold 204 likewise has tapered walls 214 but of a more acute angle, with the closed bottom 216 thereof being in the form of a rounded dome and the open top edge of wall 214 being squared with respect to the longitudinal axis of the male mold 204. Male mold 204 preferably is made of glass or ceramic.

The assembly fixture on top 206 may be of metal and is disk-shaped. If desirable, vent holes can be provided in the top 206 for the escape of air from the interior of the container. A turned down edge or side wall 218 is provided and dimensioned to tightly fit around the top edge 212 of mold 202. A concentric wall or ridge 220 is provided to closely fit edge 214 of mold 204.

Also, if desirable, a tinfoil or plastic liner can be provided adjacent the boss 210 of the female mold 202 to prevent the contents of the ice vessel from leaking therefrom. Thus, the liner would become an integral part of the ice vessel which is molded in the female and male molds 202 and 204, respectively.

In use, a measured quantity of liquid is placed into mold 202 and mold 204 is inserted therein. Since it tends to float, mold 204 is allowed to be received by ridge 220 of cap 206 and pressed downwardly into the liquid. Finally, the cap 206 is pressed over the edge 212 of mold 202 to complete the assembly.

The assembled mold 202 is then brought into contact with a suitable refrigerant to freeze the liquid contents. Freezing takes place quickly because of the high thermal conductivity of the outer mold 202 and because the major thermal mass is in the contents rather than the mold. Because edges 212 and 214 are each squared with respect to their longitudinal axis, molds 204 and 202 are co-axial. The resulting frozen product thus is radially uniform in all thickness.

Obviously, many other modifications and variations of the present invention are possible in the light of the above teachings. It is, therefore, to be understood that within the scope of the appended claim the invention may be practiced otherwise than as specifically described.

What is claimed is:

A molding arrangement for forming a disposable frosted vessel, comprising, a ceramic male mold, a metallic female mold, and a metallic member for positioning said male mold with respect to said female mold, said female mold being of substantially tapered shape and open at its upper end and closed at its lower end, said male mold being of conical shape and having its apex in the form of a dome, the base of said male mold being arranged in a plane passing through the open end of said tapered female mold, said member being disk-shaped and having a pair of spaced, annular shoulders extending transversely thereto, the upper end of said female mold being positioned between said shoulders, with the upper end of said conical-shaped mold being positioned on the inside of and adjacent to the innermost of said pair of annular shoulders, whereby said male mold is centrally positioned with respect to said female mold so that when a liquid medium is placed in the chamber between said molds and the molding arrangement is cooled by a refrigerant, a disposable frosted vessel is obtained.

References Cited in the file of this patent

UNITED STATES PATENTS

| 1,123,537 | Huizer | Jan. 5, 1915 |
| 1,943,466 | West | Jan. 16, 1934 |
| 2,011,289 | Klyce | Aug. 13, 1935 |
| 2,114,642 | West | Apr. 19, 1938 |
| 2,606,586 | Hill | Aug. 12, 1952 |
| 2,726,517 | Pruett | Dec. 13, 1955 |